W. H. SOPER.
Pipe-Coupling.
No. 228,133.                    Patented May 25, 1880.
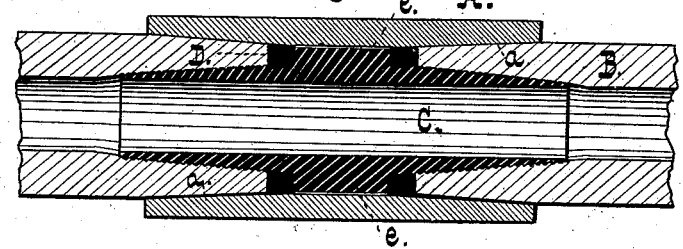
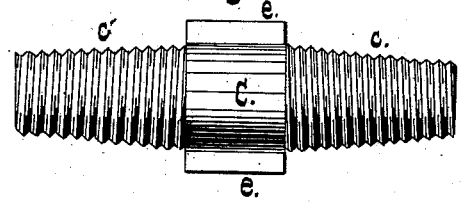
 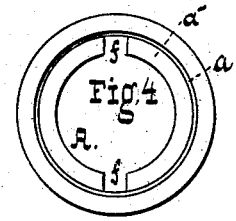
Witnesses,
W. A. Bertram.
D. L. DeBarclay.
Inventor,
W. HORACE SOPER
by
R. D. Williams
Attorney.

UNITED STATES PATENT OFFICE.

W. HORACE SOPER, OF BALTIMORE, MARYLAND.

PIPE-COUPLING.

SPECIFICATION forming part of Letters Patent No. 228,133, dated May 25, 1880.

Application filed February 24, 1880.

*To all whom it may concern:*

Be it known that I, W. HORACE SOPER, of Baltimore city, State of Maryland, have invented certain new and useful Improvements in Pipe-Couplings; and I hereby declare the same to be fully, clearly, and exactly described as follows, reference being had to the accompanying drawings, in which—

Figure 1 is a central longitudinal sectional view of the device; Fig. 2, a side elevation of the thimble; Fig. 3, a plan of the washer, and Fig. 4 an end view of the sleeve.

My invention has for its object to furnish a coupling for hose or pipes generally; but it is more especially adapted for use as a substitute for the clumsy and unsightly solder-joint used on lead pipe, and furnishes a cheap, simple, and readily-applied coupling, and one, moreover, that is fluid-tight at any pressure which the pipe will bear.

In the accompanying drawings, C is a thimble having an internal diameter equal to that of the pipe to be coupled, its tapering ends $c$ $c'$ being respectively right and left threaded, as shown. From its central cylindrical portion project lugs $e$ $e$, which enter slots $f$ $f$ on the inside of the sleeve A. The central portion of the sleeve is made of a size to fit the cylindrical portion of the thimble, and its interior diameter at either end is about equal to or slightly greater than the exterior diameter of the pipe B. Its inner walls, $a$, are made smooth and slightly tapering to a seat, $a'$, upon which, by preference, a leather, gum, vulcanite, fiber, or other washer, D, is laid.

In operation, the ends of the thimble are inserted in the ends of the pipes to be coupled and the sleeve A is turned by means of a suitable spanner or wrench, carrying with it the thimble C, which cuts its thread on the interior of the pipe B, and draws them strongly together. The threads at either end of the thimble being of equal pitch, the two ends of pipe seat home upon the washers at the same time.

Leakage between the threaded thimble and the pipe is impossible, and the interior walls of the sleeve being smooth and true, a perfectly tight joint between them and the pipe is also secured.

It is obvious that the same end would be attained by threading the interior walls of the sleeve and leaving the thimble smooth, and that sleeve and thimble may be made integral; but the described construction is to be preferred by reason of the greater facility thereby afforded for cutting the threads.

The sleeve A may be provided with a polygonal collar to facilitate its being turned, and, in lieu of lugs $e$ on the thimble and slots $f$ in the sleeve, the central portion of the thimble may be made square or polygonal and the central portion of the sleeve, of course, of a corresponding shape and size. By means of one or more lateral sleeves and thimbles the device may be made into a three or four way union.

What I claim is—

1. In a pipe-joint, an external sleeve and internal thimble, arranged, as described, to revolve together, and having an intermediate annular space, one of whose walls is threaded and the other is smooth, substantially as set forth.

2. The combination, in a pipe-joint, of the sleeve A, having smooth internal walls and one or more slots, $f$, with the tapering right-and-left-threaded thimble C, having lugs $e$, as set forth.

3. In combination with the sleeve A, having slots $f$ and seats $a'$, the thimble C, having lugs $e$, and the washer D, as set forth.

W. HORACE SOPER.

Witnesses:
R. D. WILLIAMS,
JOHN C. GITTINGER.